(12) United States Patent
Bunting

(10) Patent No.: US 8,192,152 B2
(45) Date of Patent: Jun. 5, 2012

(54) REPAIRED INTERNAL HOLDING STRUCTURES FOR GAS TURBINE ENGINE CASES AND METHOD OF REPAIRING THE SAME

(75) Inventor: Billie W. Bunting, Colchester, CT (US)

(73) Assignee: United Technologies Corporation, Hartford, CT (US)

( * ) Notice: Subject to any disclaimer, the term of this patent is extended or adjusted under 35 U.S.C. 154(b) by 1067 days.

(21) Appl. No.: 12/113,987

(22) Filed: May 2, 2008

(65) Prior Publication Data
US 2009/0274553 A1    Nov. 5, 2009

(51) Int. Cl.
  *F01D 25/24* (2006.01)
(52) U.S. Cl. ............... 415/182.1; 415/200; 415/215.1; 29/888.011
(58) Field of Classification Search ............ 415/182.1, 415/200, 215.1; 29/888.011
See application file for complete search history.

(56) References Cited

U.S. PATENT DOCUMENTS

| | | | |
|---|---|---|---|
| 4,369,016 A * | 1/1983 | Dennison | 415/142 |
| 4,549,058 A | 10/1985 | DelMastro et al. | |
| 5,180,281 A | 1/1993 | Burge | |
| 5,360,961 A | 11/1994 | Ingall et al. | |
| 5,645,399 A | 7/1997 | Angus | |
| 5,823,739 A | 10/1998 | Van Duyn | |
| 6,106,233 A | 8/2000 | Walker et al. | |
| 6,219,916 B1 | 4/2001 | Walker et al. | |
| 6,353,198 B1 | 3/2002 | Tong et al. | |
| 6,487,491 B1 | 11/2002 | Karpman | |
| 6,493,936 B2 | 12/2002 | Doi et al. | |
| 6,531,005 B1 | 3/2003 | Bezerra et al. | |
| 6,609,894 B2 | 8/2003 | Mukira et al. | |
| 6,622,906 B1 | 9/2003 | Kushibe | |
| 6,755,924 B2 | 6/2004 | Harrison et al. | |
| 6,888,090 B2 | 5/2005 | Murphy | |
| 7,220,941 B2 | 5/2007 | Niedereder | |
| 7,230,203 B2 | 6/2007 | Wimroither | |
| 7,244,320 B2 | 7/2007 | Malley et al. | |
| 7,256,368 B2 | 8/2007 | Artelsmair | |
| 7,259,349 B2 | 8/2007 | Stieglbauer | |
| 7,291,808 B2 | 11/2007 | Burgstaller | |
| 2004/0261265 A1* | 12/2004 | Hagle et al. | 29/889.2 |
| 2006/0125234 A1 | 6/2006 | Ernst | |
| 2007/0056944 A1 | 3/2007 | Artelsmair | |
| 2007/0221631 A1 | 9/2007 | Ruokolainen | |
| 2007/0283560 A1* | 12/2007 | Malley | 29/889.1 |

FOREIGN PATENT DOCUMENTS

| | | |
|---|---|---|
| EP | 1491720 | 12/2004 |
| EP | 1867835 | 12/2007 |
| WO | 2006125234 | 11/2006 |

OTHER PUBLICATIONS

European Search Report dated Aug. 11, 2009.
Fronius brochure (www.fronius.com), Jan. 2007.

(Continued)

*Primary Examiner* — Igor Kershteyn
(74) *Attorney, Agent, or Firm* — Carlson, Gaskey & Olds, PC

(57) ABSTRACT

A method of repairing a case for a gas turbine engine includes identifying areas of damage on its internal holding structures in a gas turbine case, and utilizing cold metal transfer to deposit weld material to the internal holding structures.

5 Claims, 4 Drawing Sheets

OTHER PUBLICATIONS

Article found at www.aws.org/wj/2005/06/0381 entitled: "Cold Metal Transfer Has a Future Joining Steel to Aluminum" by Jergen Bruckner, Apr. 29, 2008.

Summary Report, SR0706, Cooperative Research Program, Jun. 2007.

"Improved Methods for High-Alloy Buildups", EWi, Materials Joining Technology, Jun. 28, 2007.

U.S. Appl. No. 12/113,980, filed May 5, 2008.

U.S. Appl. No. 12/113,987, filed May 2, 2008.

* cited by examiner

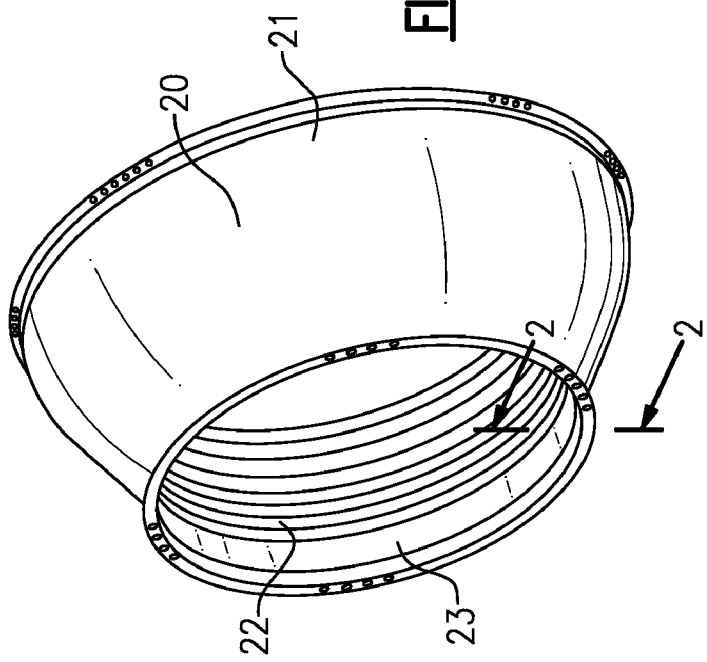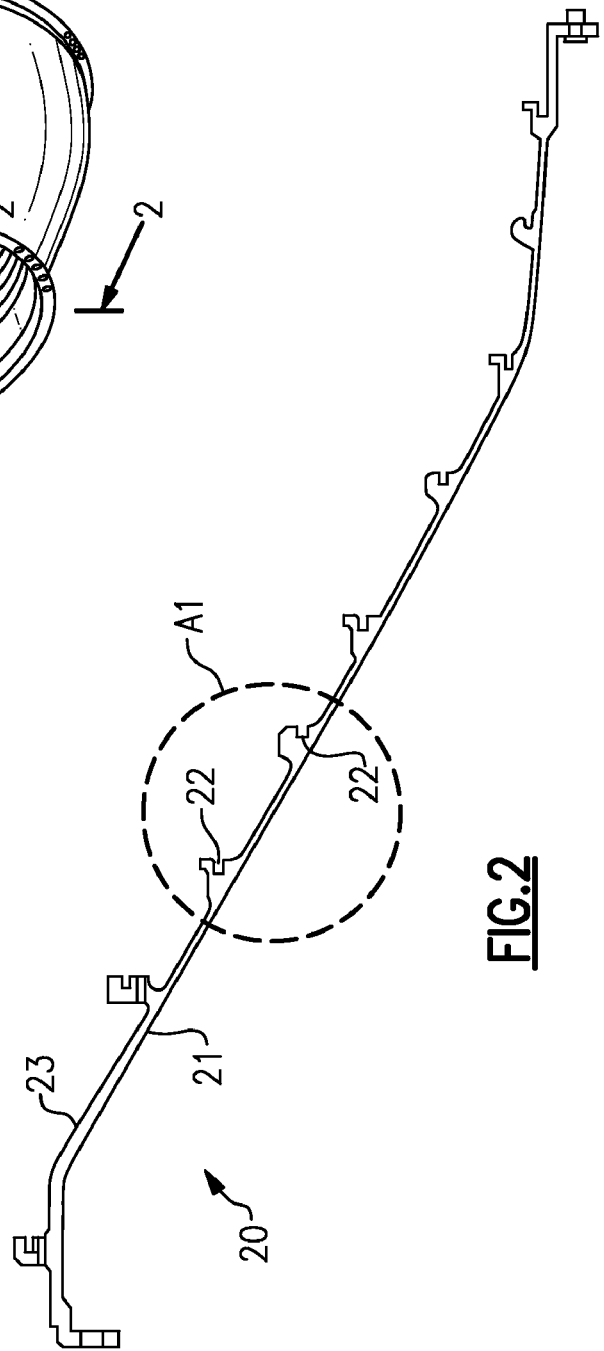

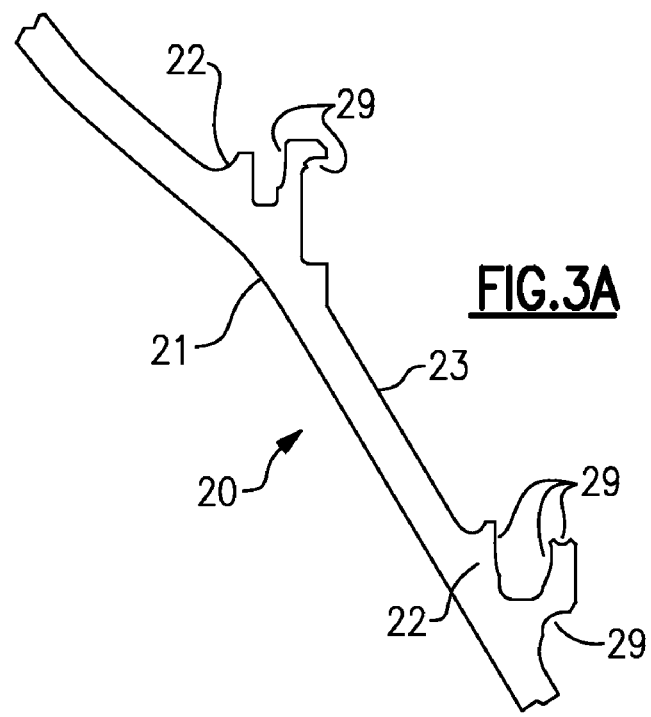
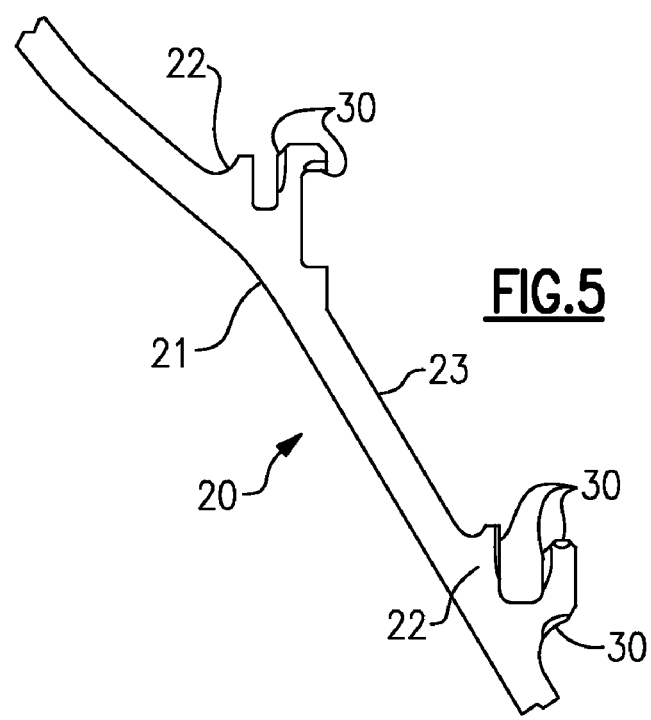

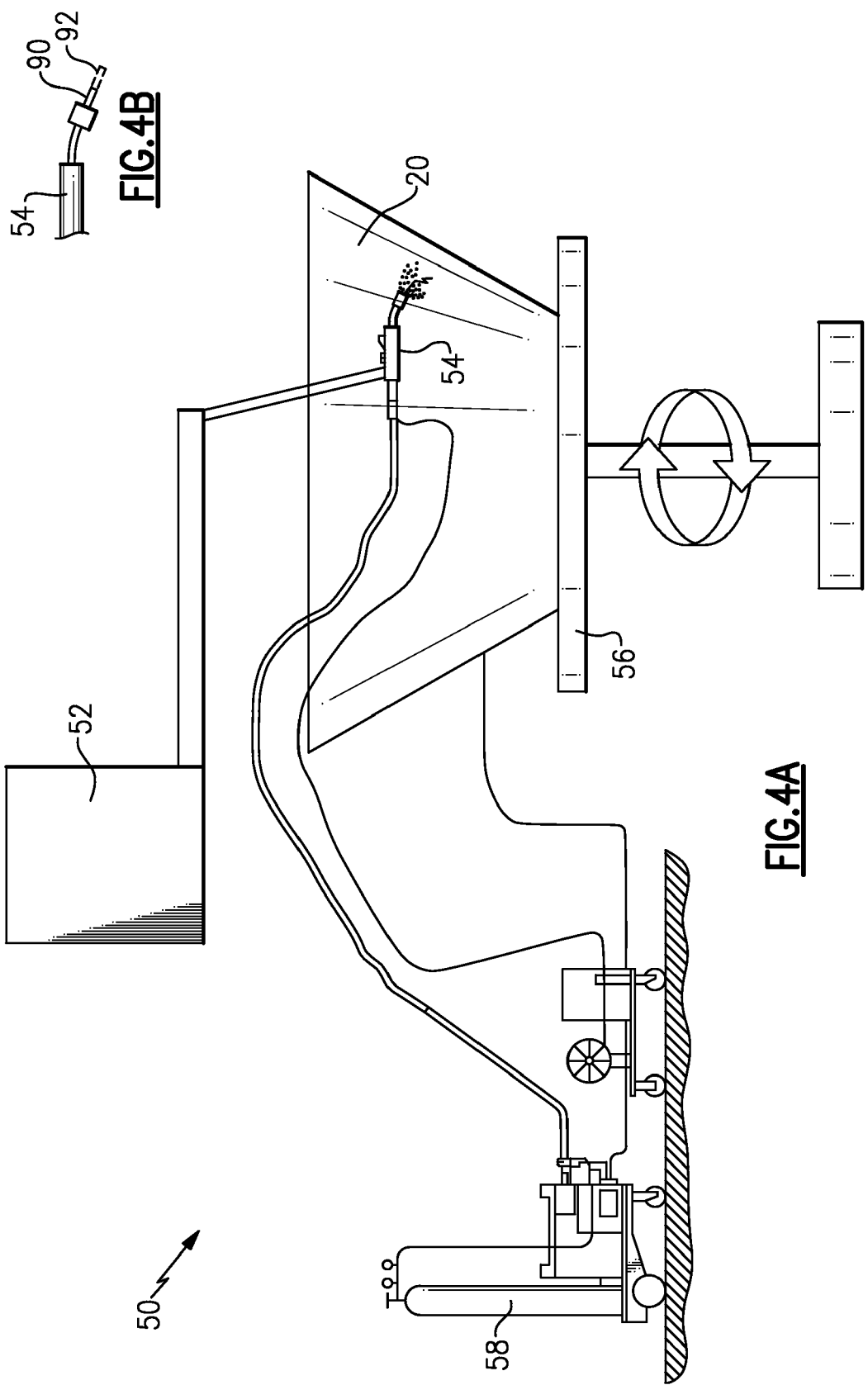

REPAIRED INTERNAL HOLDING STRUCTURES FOR GAS TURBINE ENGINE CASES AND METHOD OF REPAIRING THE SAME

BACKGROUND OF THE INVENTION

This application relates to the use of cold metal transfer techniques to repair internal holding structures, such as the rail or seal grooves on a case for a gas turbine engine.

Gas turbine engines include cases that surround the turbine sections. These cases will have internal holding structures, such as grooves to receive vanes or seals. Over time, the grooves wear, and need to be repaired.

In the prior art, these grooves have been repaired by adding additional material through welding techniques, such as manual tungsten inert gas ("TIG") welding. The cases are typically out of round and out of flatness when removed for service. Manually welding these cases is time consuming task, and is not ergonomic. Other gas turbine engine cases, such as diffuser and compressor cases, can have similar problems.

A process known as cold metal transfer ("CMT"), has been incorporated into gas metal arc or metal inert gas ("MIG") welding systems. This process reduces the spatter often associated with MIG welding. This spatter has kept MIG welding from gaining popularity in the aerospace industry. An example of the CMT process has been developed by Fronius Corporation.

The term "cold" has to be understood in terms of a welding process. When compared to a conventional MIG process, CMT is a cold process. Its characteristic feature is alternating hot and relatively cold temperature. This alternating hot and cold treatment occurs by incorporating a welding wire motion into a process control.

The wire moves forward and into a weld pool. A short circuit occurs. As the short circuit happens, the wire is pulled back again. In this way, a weld arc only inputs heat very briefly in the arcing period, after which the thermal input is immediately reduced. In this way, the alternating hot and cold occurs.

The rearward movement of the wire assists weld material droplet detachment during the short circuit. The short circuit is thus controlled and kept small.

CMT has not been utilized in repair applications for gas turbine engine cases.

SUMMARY OF THE INVENTION

A method of repairing a case for a gas turbine engine includes identifying areas of damage on its internal holding structures in a case, and utilizing cold metal transfer to deposit weld material to the internal holding structures. A repaired case is also claimed.

These and other features of the present invention can be best understood from the following specification and drawings, the following of which is a brief description.

BRIEF DESCRIPTION OF THE DRAWINGS

FIG. 1 is a perspective view of a turbine case.
FIG. 2 is a cross-sectional view taken at line 2-2 of FIG. 1.
FIG. 3A is an enlarged view of a worn area identified in FIG. 2.
FIG. 4A shows a system for applying cold metal transfer.
FIG. 4B shows a detail of the FIG. 4A system.
FIG. 5 shows the repaired part.

DETAILED DESCRIPTION OF THE PREFERRED EMBODIMENT

Figure 3B:
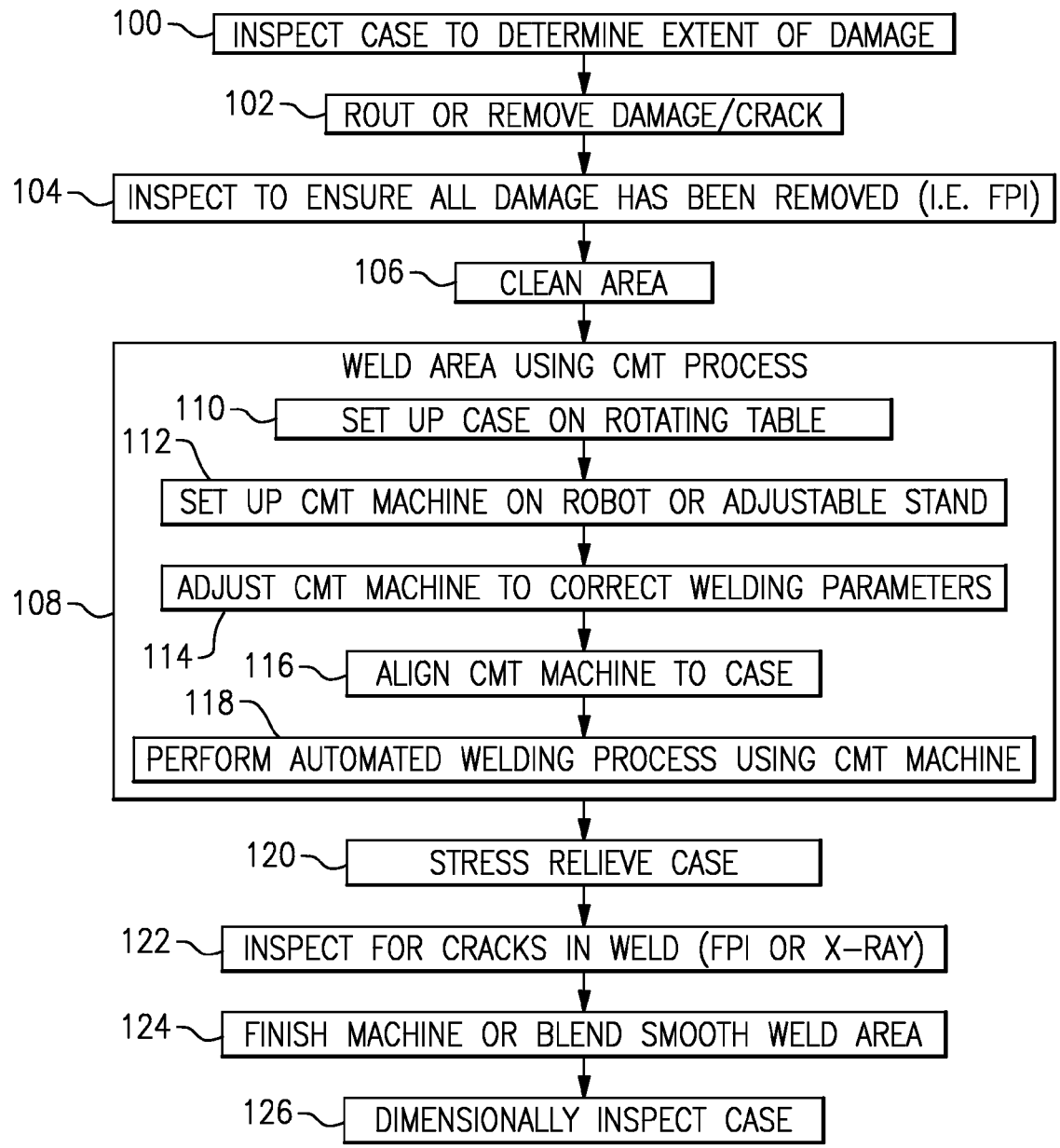
FIG. 3B is a flow chart of an exemplary method.

Historically, MIG welding processes have not been used to repair gas turbine engines for several reasons, including excessive porosity, spatter, and precision. With the improvements in these areas, the CMT process has been recognized as a viable alternative to TIG welding techniques on gas turbine engine components.

The CMT process can perform welding with relatively low heat input into the substrate. The low heat input results in less distortion to the welded features and a smaller heat affected zone. The deposition rate of the CMT process is quite faster than conventional TIG welding processes, which can reduce repair process times from hours to minutes.

A case 20 for a gas turbine engine is illustrated in FIG. 1. The case 20 is a low pressure turbine case. It should be appreciated that the case 20 may also be a high pressure turbine case, a compressor case or a diffuser case. Case 20 is defined by a body having a radially outer wall 21 and a radially inner wall 23.

A plurality of rails or grooves 22 are formed on the inner wall 23 of the case 20. For purposes of this application, the rails or grooves will be referred to generically as "internal holding structures."

As shown in FIG. 2, the internal holding structures 22 have specific shapes to receive an engaging rail or seal. These shapes should be maintained at their desired configuration in order for the seals and rails to properly interact with the case 20.

As shown in FIG. 3A, surfaces such as shown at 29 may wear away from the internal holding structures 22. In fact, the worn shapes are generally less smooth than is illustrated in FIG. 3A, and they may also include cracked areas, etc.

A flow chart of a repair method is shown as FIG. 3B. At step 100, a case 20 is inspected to determine the extent of the damage to the grooves. The damages areas are then machined at step 102 to remove damaged and cracked areas. At step 104, one then inspects the part to ensure that all the damaged material has been removed, and the areas are cleaned at step 106.

Cold metal transfer techniques are utilized at step 108 to repair the part. The case 20 is initially set on a rotating table 56 at step 110, and as shown in FIG. 4A. A system 50 includes a robotic manipulator 52 moving a cold metal transfer deposition head 54 connected to a cold metal transfer machine 58.

After the part is on the rotating table, the cold metal transfer machine is placed adjacent the table at step 112, and is adjusted at step 114 to meet the desired welding parameters for the particular part. The cold metal transfer machine is then aligned to the case at step 116, and the automated welding process occurs at step 118.

As can be appreciated from FIG. 4B, the cold metal transfer deposition head 54 includes a weld wire 90. The wire moves forward, as shown in phantom at 92 and into a weld pool. A short circuit occurs. As the short circuit happens, the wire is pulled back again. A weld arc only inputs heat very briefly in the arcing period, after which the thermal input is immediately reduced. In this way, the alternating hot and cold occurs.

After the cold metal transfer welding occurs, the part is stress relieved at step 120, and inspected for cracks in the weld at step 122. Finish machining or blending to smooth the welded areas may occur at step 124, and the part may then be dimensionally inspected at step 126 for return to service.

As shown in FIG. 5, after this method, the welding material 30 has returned the surfaces of the internal holding structures 22 to their desired shape. The case 20 will now be ready for return of service, and will function properly.

While a particular assembly of cold metal transfer equipment has been illustrated in FIG. 4A, other assemblies may be utilized. As an example, the case 20 could be held stationary while the cold metal transfer deposition head could be rotated about the case 20. Further, other robotic machines may be utilized, beyond that shown in FIG. 4A.

Although an embodiment of this invention has been disclosed, a worker of ordinary skill in this art would recognize that certain modifications would come within the scope of this invention. For that reason, the following claims should be studied to determine the true scope and content of this invention.

What is claimed is:

1. A method of repairing a case for a gas turbine engine, comprising the steps of:
   a) inspecting a case having an outer periphery and an inner periphery, with said inner periphery having internal holding structures, and identifying areas of damage on said internal holding structures in a gas turbine engine case; and
   b) utilizing cold metal transfer to deposit weld material to said internal holding structures.

2. The method as set forth in claim 1, wherein damaged areas are removed from the internal holding structures prior to the deposition of the weld material.

3. The method as set forth in claim 1, wherein the case is a low pressure turbine case.

4. The method as set forth in claim 1, wherein the cold metal transfer is applied by a initially putting the case on rotating table, and rotating the case while a cold metal transfer deposition head deposits material to the internal holding structures.

5. The method as set forth in claim 1, wherein the cold metal transfer includes moving a weld wire to provide alternating hot and cold operation.

* * * * *